(12) United States Patent
McCarney (10) Patent No.: US 9,149,046 B2
(45) Date of Patent: Oct. 6, 2015

(54) TORTILLA PRESS ASSEMBLY

(71) Applicant: Kevin McCarney, North Hollywood, CA (US)

(72) Inventor: Kevin McCarney, North Hollywood, CA (US)

( * ) Notice: Subject to any disclaimer, the term of this patent is extended or adjusted under 35 U.S.C. 154(b) by 20 days.

(21) Appl. No.: 14/017,240

(22) Filed: Sep. 3, 2013

(65) Prior Publication Data

US 2015/0064301 A1  Mar. 5, 2015

(51) Int. Cl.
*A21C 11/00* (2006.01)
*A21C 11/08* (2006.01)

(52) U.S. Cl.
CPC ............... *A21C 11/006* (2013.01); *A21C 11/08* (2013.01)

(58) Field of Classification Search
CPC ............................. A21C 11/006; A21C 11/08
USPC .......... 425/318, 408, 409; 99/353, 432, 450.1; 74/45, 48–49, 53–55, 491, 504, 254
See application file for complete search history.

(56) References Cited

U.S. PATENT DOCUMENTS

| | | | |
|---|---|---|---|
| 1,880,858 A | 10/1932 | Davis | |
| 2,626,133 A * | 1/1953 | Reed | 425/135 |
| 2,875,808 A * | 3/1959 | Nelson | 100/288 |
| 2,975,741 A | 3/1961 | Ruffino | |
| 3,068,778 A | 12/1962 | Majerus | |
| 3,716,319 A | 2/1973 | Norman | |
| 3,814,005 A | 6/1974 | Widdel | |
| 3,949,660 A | 4/1976 | Kuhlman | |
| 4,060,367 A | 11/1977 | Shatila et al. | |
| D255,412 S | 6/1980 | Bereza | |
| 4,303,677 A | 12/1981 | Acetis | |
| 4,465,452 A * | 8/1984 | Masuzawa | 425/308 |
| 4,498,377 A * | 2/1985 | Smith | 425/132 |
| 4,508,025 A | 4/1985 | Schultz et al. | |
| 4,559,002 A | 12/1985 | Atwood | |
| 4,634,365 A | 1/1987 | Triporo et al. | |
| 4,690,043 A | 9/1987 | Pacilio | |
| 4,857,349 A | 8/1989 | Finlay | |
| 4,874,156 A | 10/1989 | Goldzweig | |
| D307,371 S | 4/1990 | D'Orlando | |
| 4,973,240 A | 11/1990 | Reily | |
| 4,974,965 A * | 12/1990 | Heinhold et al. | 99/455 |
| 4,993,932 A | 2/1991 | D'Andrade | |
| 5,074,778 A | 12/1991 | Betts, Jr. et al. | |
| 5,088,912 A | 2/1992 | Raque et al. | |
| 5,149,594 A | 9/1992 | Lewandowski et al. | |
| 5,154,115 A | 10/1992 | Kian | |
| 5,226,352 A | 7/1993 | Savage | |
| D343,627 S | 1/1994 | Raio | |
| 5,417,149 A | 5/1995 | Raio et al. | |
| 5,469,779 A | 11/1995 | Amore et al. | |
| D369,941 S | 5/1996 | Ramina | |
| D377,138 S | 1/1997 | Angelo | |
| 5,630,358 A | 5/1997 | Patel | |
| 5,800,844 A | 9/1998 | Raio et al. | |
| 5,996,476 A | 12/1999 | Schultz | |

(Continued)

*Primary Examiner* — Joseph S Del Sole
*Assistant Examiner* — Thukhanh T Nguyen
(74) *Attorney, Agent, or Firm* — Tsircou Law, P.C.

(57) ABSTRACT

A tortilla press assembly is provided having an actuating mechanism for actuating the push plate along an actuating axis between a loading position and a forming position. The actuating mechanism includes arm having a vertical portion and a horizontal portion that extends over the base plate. A crank extends between the crank shaft and the vertical portion of the arm to enable the push plate to engage and disengage from dough in a smooth manner to ensure proper formation of a tortilla shell, which can include an embossed pattern.

18 Claims, 6 Drawing Sheets

(56) References Cited

U.S. PATENT DOCUMENTS

| | | |
|---|---|---|
| 6,089,144 A | 7/2000 | Garber et al. |
| 6,205,914 B1 | 3/2001 | McCarney |
| 6,224,167 B1 | 5/2001 | Riley |
| 6,244,167 B1 | 6/2001 | Mc Carney |
| 6,332,768 B1 | 12/2001 | Raio et al. |
| 6,443,054 B1 | 9/2002 | McCarney |
| 6,848,356 B1 * | 2/2005 | Mueller .......................... 99/455 |
| 6,990,892 B2 | 1/2006 | Errera |
| 7,140,864 B1 | 11/2006 | McCarney |
| 7,331,776 B2 | 2/2008 | Errera |
| 7,628,603 B2 | 12/2009 | Lichtenstein |
| 8,029,844 B2 | 10/2011 | Lichtenstein |
| 8,286,548 B2 | 10/2012 | Krishnan et al. |

\* cited by examiner

TORTILLA PRESS ASSEMBLY

FIELD OF THE INVENTION

The present invention relates generally to forming tortilla shells and, more particularly, to a tortilla press assembly for making a tortilla shell from a ball of dough.

INCORPORATION BY REFERENCE

The present invention relates to forming a tortilla shell from a ball of dough wherein the forming of the shell is done by a hand-operated machine.

BACKGROUND OF THE INVENTION

It is well known that a ball of dough can be molded into various shapes and sizes to produce food products. Traditionally, once the desired dough was properly mixed, the dough was rolled to the proper thickness and then cut into the shape needed to produce the food product. However, this method is labor-intensive and costly with respect to retail food products and restaurant services.

Over the years, machines have been utilized to overcome this problem by mechanically forming dough into the desired thickness and shape. Such machines are known in the art and are generally shown in McCarney U.S. Pat. No. 6,205,914, McCarney U.S. Pat. No. 6,244,167 and McCarney U.S. Pat. No. 7,140,864. These patents are incorporated by reference herein and background information illustrating hand-operated tortilla press assemblies that form a ball of dough into a tortilla shell. These approaches overcame many of the problems in the prior art with respect to producing various sizes of shells by utilizing a ring or disk structure which dictates the peripheral configuration and thickness of the resulting tortilla shell.

Although such prior art approach were generally effective, shortfalls exist. For example is it desirable to improve on the distribution of dough evenly throughout. Moreover, current approaches lacked the ability to provide sharp imprinting of a pattern, design, or mark on to the press dough. In current approaches, attempts to emboss patterns can result in uneven or marred images.

It should be appreciated that there remains a need for a tortilla press that addresses the aforementioned shortcomings. The present invention solves these needs and others.

SUMMARY OF THE INVENTION

Briefly, and in general terms, by example and not limitation, the invention provides a tortilla press assembly having an actuating mechanism for actuating the push plate along an actuating axis between a loading position and a forming position. The actuating mechanism includes arm having a vertical portion and a horizontal portion that extends over the base plate. A crank extends between the crank shaft and the vertical portion of the arm to enable the push plate to engage and disengage from dough in a smooth manner to ensure proper formation of a tortilla shell, which can include an embossed pattern.

More specifically, an exemplary embodiment in accordance with the invention, the base plate of the assembly includes an upwardly facing forming surface that defines a recess for receiving a dough ball. The push plate includes a downwardly facing forming surface that cooperates with the forming surface of the base plate to define a mold cavity for forming the dough ball into a tortilla shell. The actuating mechanism includes a crank shaft defining shaft axis transverse to the vertical portion of the arm, a crank extending between the crank shaft and the crank recess of the arm, operatively coupled thereto, and a handle attached to the crank shaft to turn the crank shaft about the shaft axis, thereby actuating the second forming surface along the actuating axis between a loading position and a forming position to mold dough into a tortilla shell.

In a detailed aspect of an exemplary embodiment in accordance with the invention, at least one of the first forming surface and the second forming surface includes an embossing pattern.

In another detailed aspect of an exemplary embodiment in accordance with the invention, the base plate includes a first side defining the first forming surface having a first diameter that results in a forming a tortilla shell sized to the first diameter and a second side defining a third forming surface having a third diameter that results in a forming a tortilla shell sized to the third diameter. One of the forming surfaces can include an embossing pattern to emboss the tortilla shell The tortilla press assembly allows a tortilla shell to be quickly formed into a desired thickness and peripheral shape. With respect to the methods used to control the thickness and peripheral shape of the tortilla shell, either one of the upwardly or downwardly facing surfaces can include a cavity corresponding with the configuration and thickness of the tortilla shell.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

With reference now to the drawings, there is shown a tortilla press assembly 10 that molds dough into a tortilla shell between a push plate 12 and a base plate 14. The tortilla press assembly further includes an actuating mechanism 16 for actuating the push plate along an actuating axis ($A_a$) between a loading position and a forming position. The base plate 14 includes an upwardly facing forming surface 18 that defines a recess for receiving a dough ball. The push plate includes a downwardly facing forming surface 20 that cooperates with the forming surface of the base plate to define a mold cavity 22 for forming the dough ball into a tortilla shell.

Figure 5:
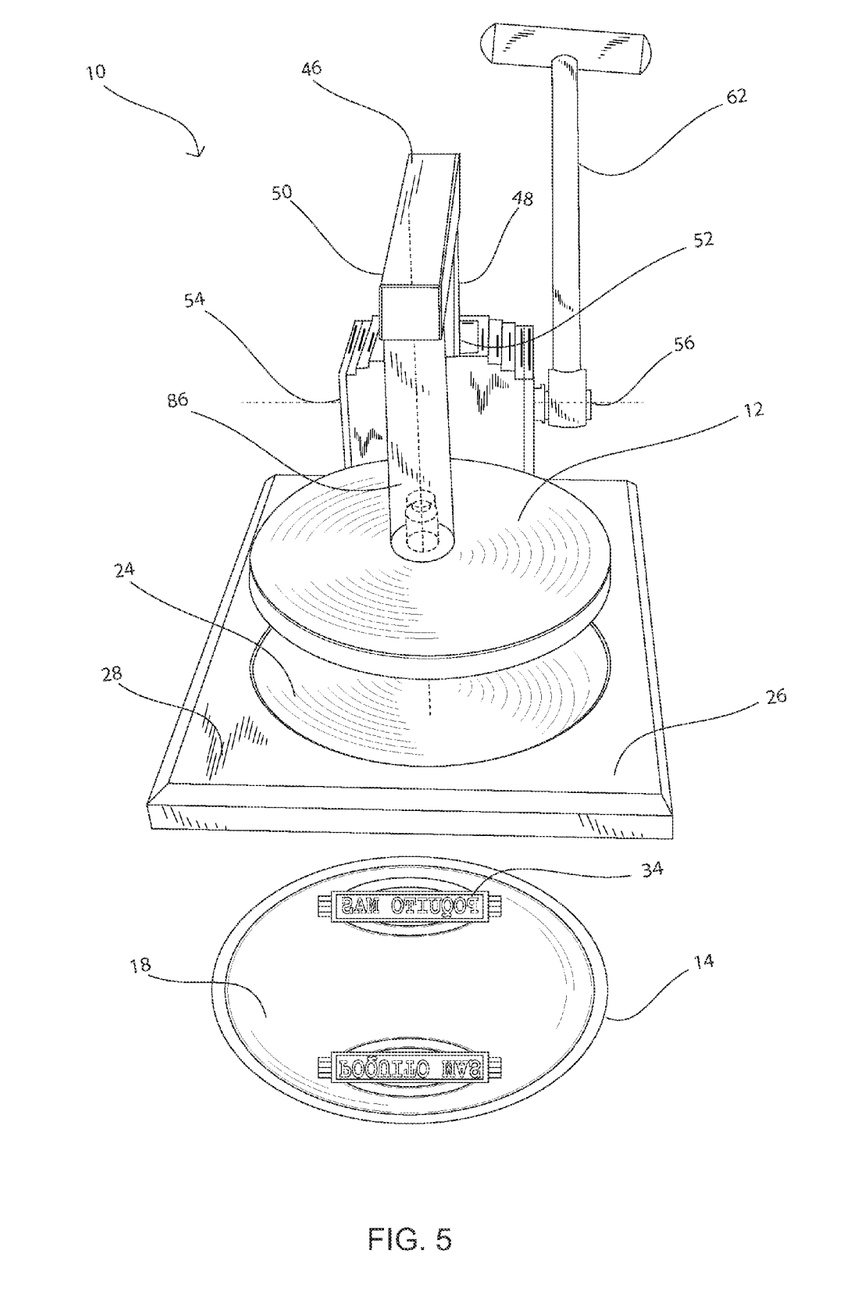
FIG. 5 is a front perspective view of a tortilla press assembly of FIG. 1, depicting a base plate removed from a base and positioned adjacent to the base.

In the present embodiment, a mold cavity 22 is configured to form a circular tortilla shell having an embossed pattern. The upper forming surface 20 provides the top wall of the mold cavity, and the lower forming surface 18 provides the sidewall and bottom wall of mold cavity. At least one of the forming surfaces (18, 20) can include an embossing pattern to emboss the resulting tortilla shell. In the present embodiment, the base plate 14 includes an embossing pattern 34 (FIG. 5) defined by the forming surface 18.

Figure 6:
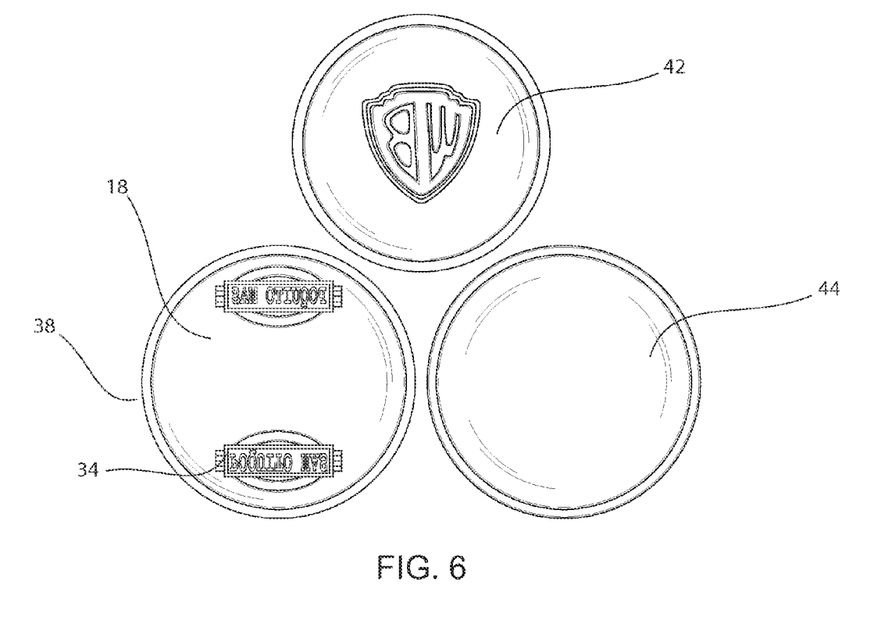
FIG. 6 is plan view of a first side of several base plates useable with the tortilla press assembly of FIG. 1
Figure 7:
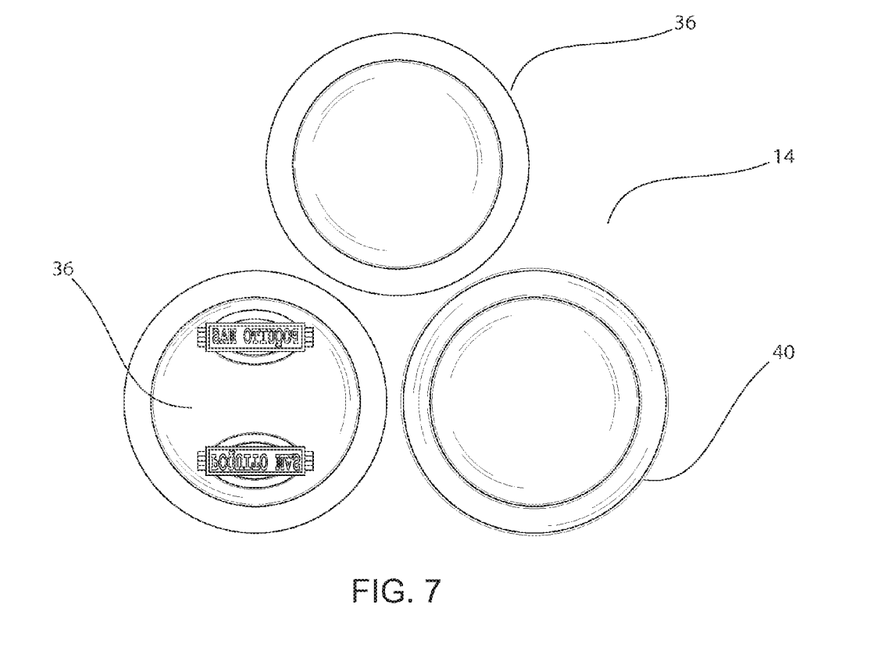
FIG. 7 is plan view of a second side of several base plates useable with the tortilla press assembly of FIG. 1.

With reference to FIGS. 6 and 7, the base plate 14 includes two forming surfaces 18 and 36, defined by each side 38, 40, that can be used interchangeably, to provide different options for sizes and/or embossing of the resulting tortilla shell. The forming surface 18 of side 38 has a larger diameter than the forming surface 36 of side 40. In addition, embossing patterns can be provided by either or both sides of the base plate. As shown in FIGS. 6 and 7, several base plates (14, 42, and 44) can be provided to create tortillas shells, of various sizes and embossing patterns. The tortilla press assembly is configured such that a user can quickly switch out base plates to create the desired tortilla shell.

More particularly, the base plate 14 simply sits within a recess 24 (FIG. 4) defined by a base 26. The base includes a top surface 28, a bottom surface 30, and a sidewall 32. The top surface 28 of the base 26 defines the upper recess 24 that supports the base plate 14. More particularly, the upper recess 24 has a generally circular cross-section and a prescribed depth for retaining the base plate, so that the base plate is aligns with the actuating axis ($A_a$). In the exemplary embodiment, the base plate is not inhibited from rotating about the actuating axis ($A_a$) within the recess. However, in other embodiment, the base plate can be coupled to the recess to prevent rotation about the actuating axis ($A_a$).

Figure 1:
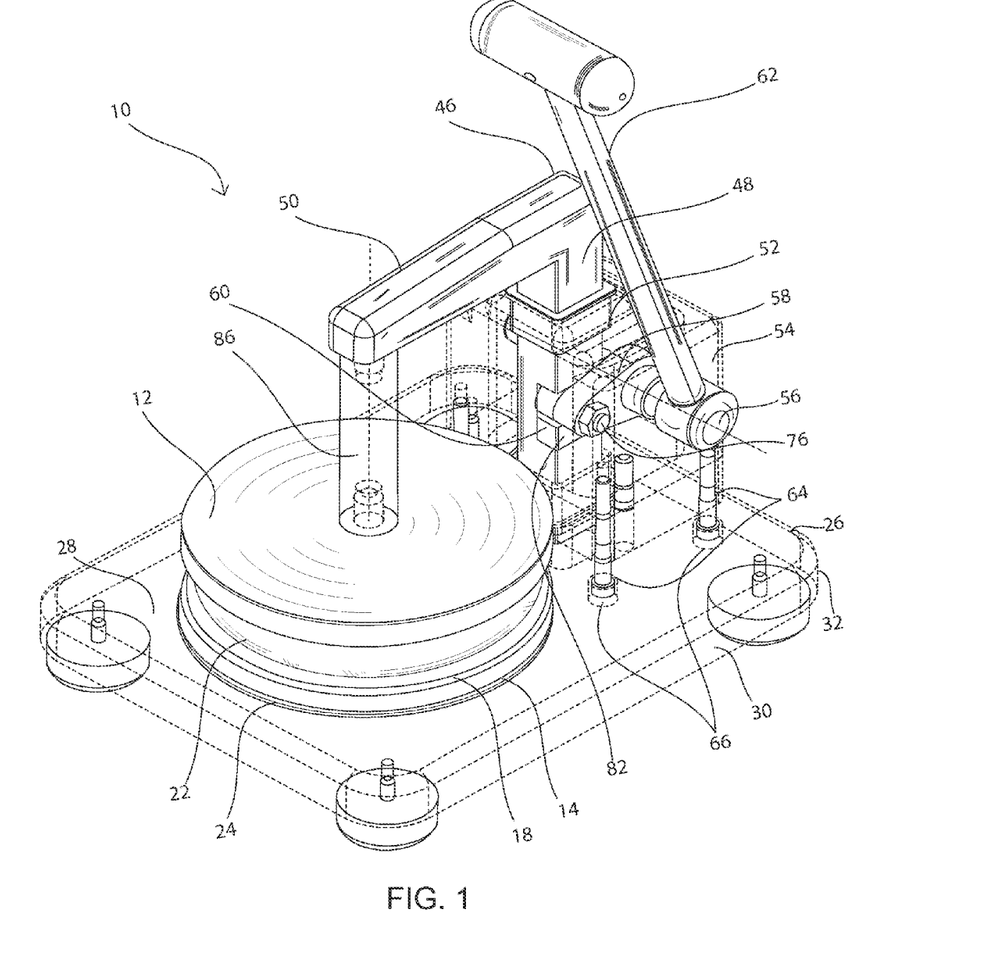
FIG. 1 is a front perspective view of a tortilla press assembly in accordance with the invention, having an actuating mechanism for actuating a push plate between a loading position and a forming position to mold dough into a tortilla shell.

With again to reference to FIG. 1, the push plate 12 is circular, having a diameter greater than the desired diameter of a formed tortilla shell. In the exemplary embodiment, the forming surface 20 of the push plate 12 is flat, and the diameter(s) of the push plate and the forming surface 18 exceeds that of the forming surfaces of the base plate.

Figure 2:
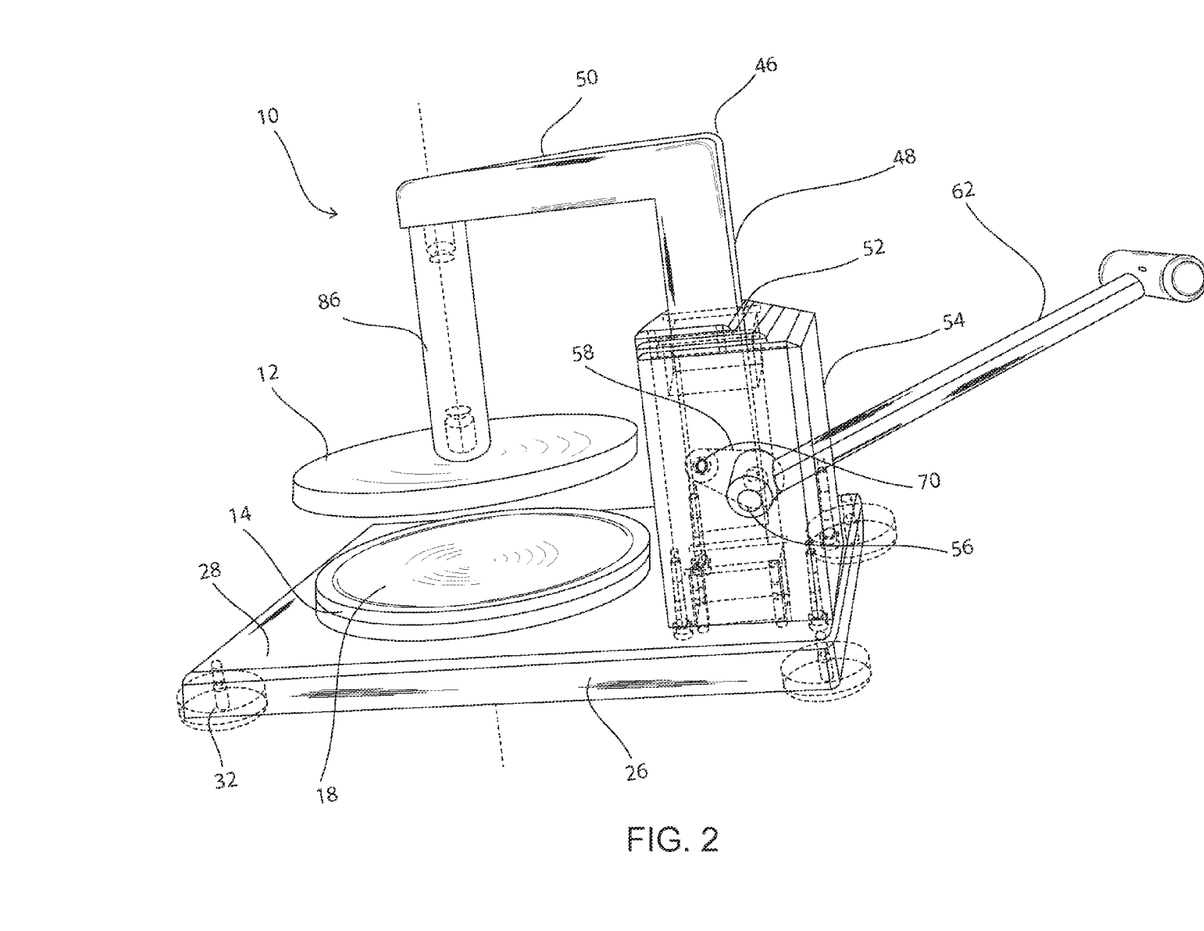
FIG. 2 is a side elevational view of the tortilla press assembly of FIG. 1, depicting selected internal components of the actuating mechanism, with the push plate in the loading position.
Figure 3:
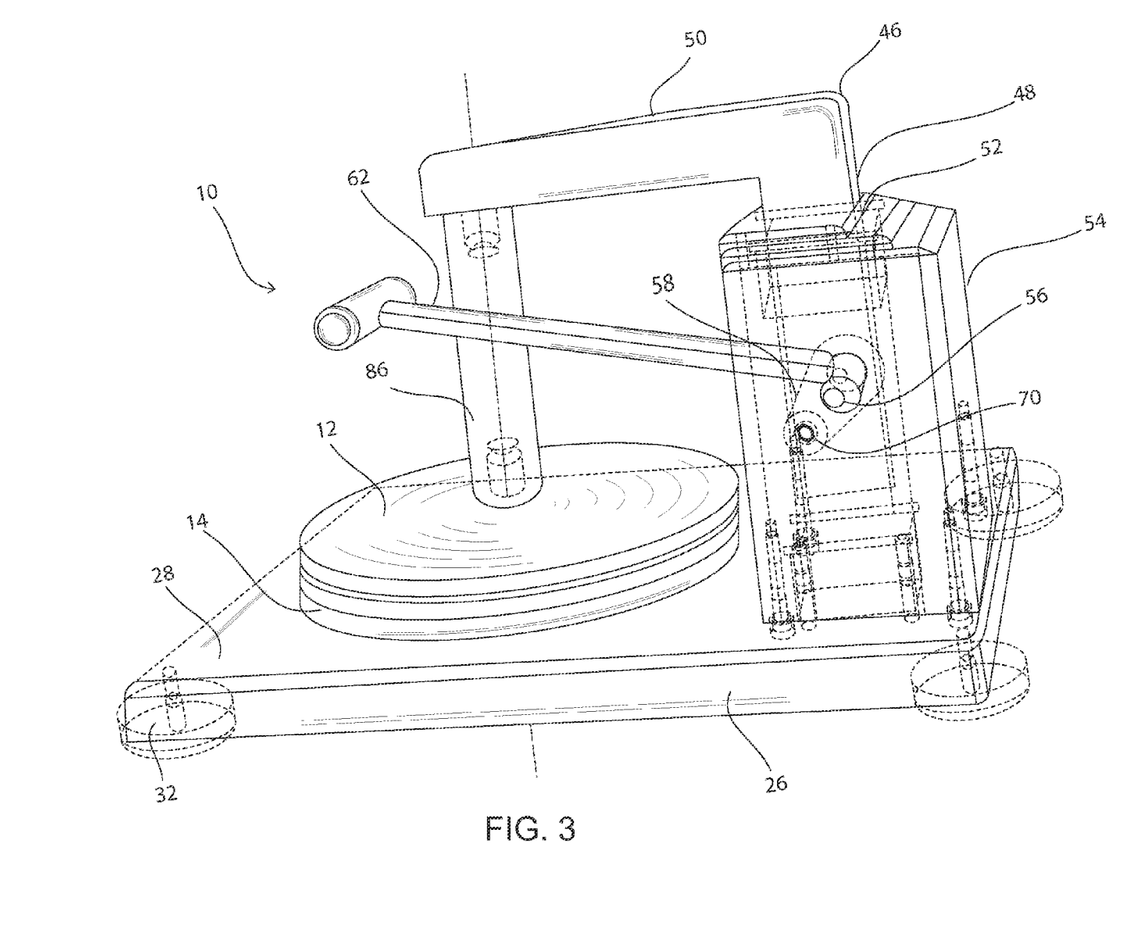
FIG. 3 is a side elevational view of the tortilla press assembly of FIG. 1, depicting selected internal components of the actuating mechanism, with the push plate in the forming position.

With reference to FIGS. 2 and 3, the tortilla press assembly 10 includes an actuating mechanism 16 (FIG. 4) for actuating the press plate 12 along the actuating axis ($A_a$) between a loading position (FIG. 2) and a forming position (FIG. 3) to mold dough into a tortilla shell. The actuating mechanism 16 includes an arm 46 having a vertical portion 48 and a horizontal portion 50 that extends over the base plate. The arm is operatively coupled to components with a housing 54 of the actuating mechanism. The vertical portion of the arm extends out of the upper opening 52 of the housing. The push plate 12 is attached via a threaded attachment to an extension 86 that projects down from the horizontal portion 50 of the arm 46.

The actuating mechanism 16 includes a crank shaft 56 that defines shaft axis ($A_s$) axis transverse to the vertical portion 48 of the arm 46. A crank 58 extends between the crank shaft and the vertical portion of the arm. The vertical portion defines a crank recess 60 in the vertical portion thereof. A handle 62 is attached to the crank shaft to turn the crank shaft about the shaft axis, thereby actuating the second forming surface along the actuating axis between a loading position and a forming position to mold dough into a tortilla shell.

Figure 4:
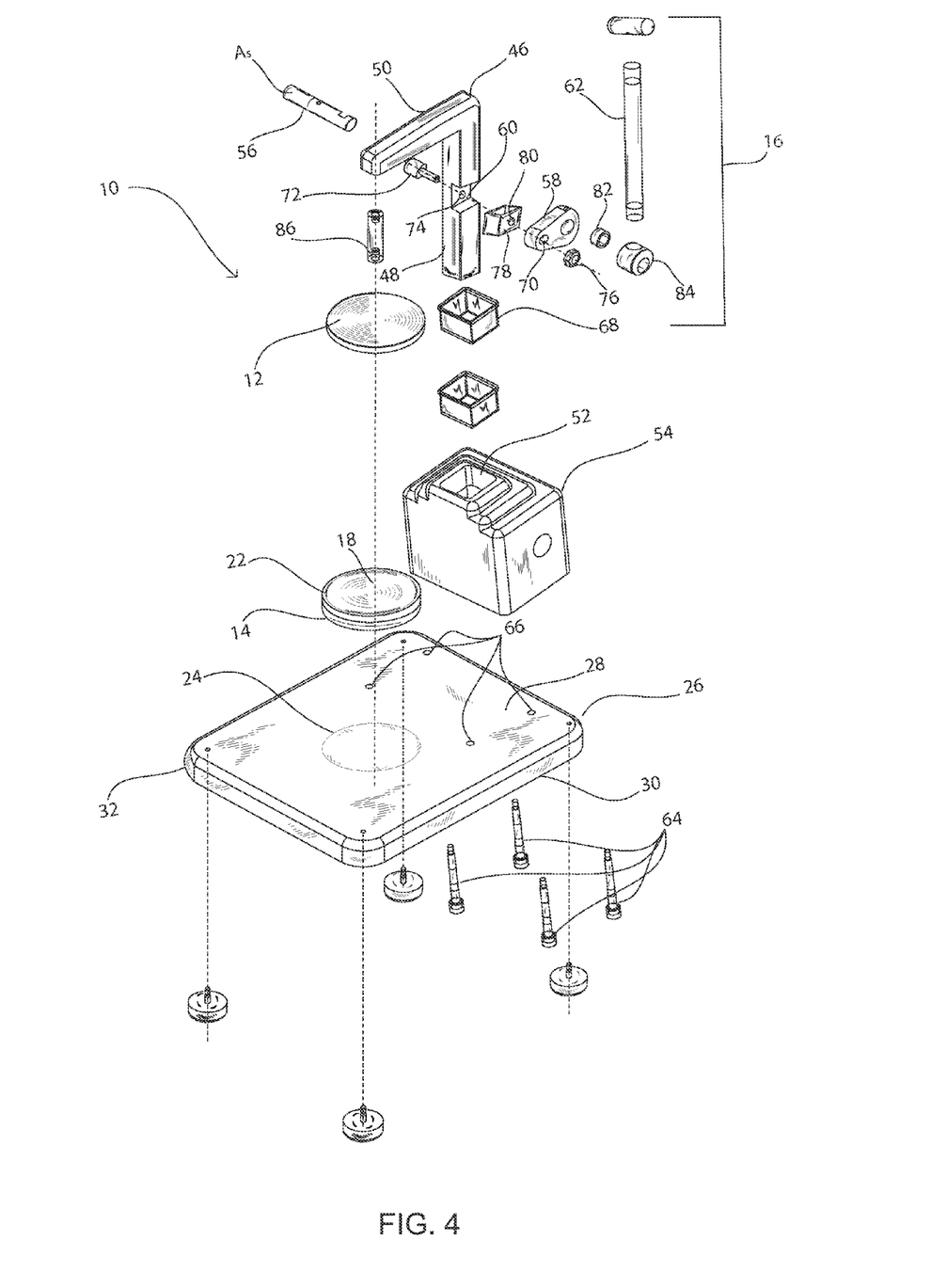
FIG. 4 is an exploded side view of the tortilla press of FIG. 1.

The housing 54 is attached to the base adjacent to the base recess 24, resting on top surface 28 of base 26. More particularly, the housing is securely fastened to base 26 by a plurality of fasteners 64. The base 26 includes a plurality of through holes 66 shaped and sized to receive the fasteners 64. In addition, housing includes a plurality of threaded holes 68 extending inwardly from its bottom surface that aligns with through holes 66 of base 26. The fasteners have a sufficient treaded length to extend through holes 66 and engage with threaded holes 68 to secure actuating mechanism 16 to base 26. It should be noted that actuating mechanism can be connected or fastened to the base by any known means of securing two objects relative to one another.

The crank shaft 56 extends between sidewalls of the housing 54, with a portion of the crank shaft extending through an aperture in one of the sidewalls. The handle 62 attaches to the external portion of the crank shaft 56. The crank 58 defines a first aperture 67 conformably secure a first end of the crank to the crank shaft. The crank shaft 56 extends through the first aperture 67. In the exemplary embodiment, the actuating mechanism further includes a sleeve 69 disposed in the first aperture 67 between the crank and the crank shaft to ensure a secure fit. The crank further defines a second aperture 70 for securing the crank to the arm 46. A cam follower 72 extends through the second aperture and couples to a threaded hole 74 defined by the vertical portion of the arm. The threaded hole is provided in the crank recess 60. The cam follower includes a treaded post and a rotating cap 76 at a distal end. A spacer 78 defining a through hole 80 is disposed between the arm and the crank. The cam follower extends through the through hole 80 of the spacer 78 to couple to the threaded hole 75 of the arm. The spacer has sufficient depth to position the crank out of the recess 60. An insert 82 is disposed below the spacer 78, within the recess 80. The insert 82 is attached to the arm by a fastener 84.

With reference again to FIGS. 6 and 7, the base plates 14, 42, 44 are each sized to be received the base recess 24, interchangeably. The tortilla press assembly is configured such that a user can quickly switch out base plates to create the desired tortilla shell. The base plates 14, 42, 44 all have the same overall diameter, and provide two forming surfaces—one on each side of the corresponding base plate. Each forming surface can be configured to provide a prescribed size tortilla having unique embossing patterns 88, 90. Alternatively, the forming surface can exclude an embossing pattern (e.g., 44). The forming surfaces of the base plates 14, 42, 44 are all configured to define a corresponding mold cavity with the forming surface 20 of the push plate, in which the forming surface 20 defines an upper planar wall of the mold cavity and the forming surface of the corresponding base plate defines a cylindrical sidewall and a planar floor. Any or all of the forming surfaces can include an embossing pattern, including the forming surface of the push plate.

In operation, the user rotates handle 62 counterclockwise about the shaft axis ($A_s$), causing the crank to rotate about the shaft axis ($A_s$) centered on the first aperture 67. Since cam follower 72 is locked in position to the arm and the crank, the follower forces the arm downwardly. As this occurs, the vertical portion of the arm moves axially downwardly through a hole 86 defined by the base 26. The horizontal portion 50 of the arm also travels downwardly. As a result, the forming surface 20 of push plate 12 also moves downwardly toward base 12 along the actuating axis ($A_a$). During this entire motion, the downwardly facing forming surface 18 is maintained parallel to the upwardly facing forming surface 20 of the base plate 14. Accordingly, as the forming surface 18 of the push plate engages the dough ball, it evenly spreads the dough between the parallel surfaces to produce a more uniform thickness tortilla shell.

With the tortilla press assembly 10 held in the forming position, the tortilla shell is formed and the user can either rotate the handle back or merely release the handle if a spring return is utilized. As this takes place, the push plate moves upwardly, parallel to the base plate, disengaging from the tortilla evenly. The resulting tortilla shell includes an embossed feature provided by the embossed pattern of the forming surface.

Although the invention has been disclosed in detail with reference only to the exemplary embodiments, those skilled in the art will appreciate that various other embodiments can be provided without departing from the scope of the invention. Accordingly, the invention is defined only by the claims set forth below.

What is claimed is:

1. A tortilla press assembly for molding dough into a tortilla shell, said forming machine comprising:
    a base;
    a base plate having a first forming surface;
    a push plate having a second forming surface disposed above and axially aligned with the first forming surface along an actuating axis perpendicular to the base plate; and
    an actuating mechanism for actuating said second forming surface along the actuating axis between a loading position and a forming position to mold dough into a tortilla shell along the actuating axis, the actuating mechanism including
        a mechanism housing attached to the base adjacent to the base plate, the housing defining an upper opening,
        an arm having a vertical portion extending out of the upper opening and a horizontal portion extending from the vertical portion over the base plate, the vertical portion defining a crank recess,
        a crank shaft defining shaft axis transverse to the vertical portion of the arm,
        a crank extending between the crank shaft and the crank recess of the arm, operatively coupled thereto, and
        a handle attached to the crank shaft to turn the crank shaft about the shaft axis, thereby actuating the second forming surface along the actuating axis between a loading position and a forming position to mold dough into a tortilla shell.

2. The tortilla press assembly as defined in claim 1, wherein at least one of the first forming surface and the second forming surface includes an embossing pattern.

3. The tortilla press assembly as defined in claim 1, wherein the base plate includes a first side defining the first forming surface having a first diameter that results in a forming a tortilla shell sized to the first diameter and a second side defining a third forming surface having a third diameter that results in a forming a tortilla shell sized to the third diameter.

4. The tortilla press assembly as defined in claim 3, wherein at least one of the second forming surface and the third forming surface includes an embossing pattern to emboss the tortilla shell.

5. The tortilla press assembly as defined in claim 1, further comprising an extension having an upper end attached to the horizontal portion of the arm and a lower end attached to the push plate.

6. The tortilla press assembly as defined in claim 5, wherein the first forming surface of the push plate is a smooth, planar surface.

7. A tortilla press assembly for molding dough into a tortilla shell, said forming machine comprising:
    a base plate having a first forming surface;
    a push plate having a second forming surface disposed above and axially aligned with the first forming surface along an actuating axis, the push plate mounted for movement only along the actuating axis;
    an actuating mechanism for actuating said second forming surface along the actuating axis between a loading position and a forming position to mold dough into a tortilla shell along the actuating axis, the actuating mechanism including,
        a mechanism housing adjacent to the base plate, the housing defining an upper opening,
        an arm having a vertical portion extending out of the upper opening and a horizontal portion extending from the vertical portion over the base plate, the vertical portion defining a crank recess along a sidewall thereof,
        a crank shaft defining shaft axis and extending across the housing transverse to the vertical portion of the arm,
        a crank extending between the crank shaft and the crank recess of the arm, operatively coupled thereto,
        a cam follower attaching the crank to the crank recess of the arm, and
        a handle attached to the crank shaft to turn the crank shaft about the shaft axis, thereby actuating the second forming surface along the actuating axis between a loading position and a forming position to mold dough into a tortilla shell.

8. The tortilla press assembly as defined in claim 7, further comprising an insert disposed about the cam follower such that crank shaft is positioned out of the crank recess.

9. The tortilla press assembly as defined in claim 7, wherein the crank defines a first aperture through which the crank shaft is received and a second aperture through which the cam follower is received.

10. The tortilla press assembly as defined in claim 7, wherein the base plate includes a first side defining the first forming surface having a first diameter that results in a forming a tortilla shell sized to the first diameter and a second side defining a third forming surface having a third diameter that results in a forming a tortilla shell sized to the third diameter.

11. The tortilla press assembly as defined in claim 10, wherein at least one of the second forming surface and the third forming surface includes an embossing pattern to emboss the tortilla shell.

12. The tortilla press assembly as defined in claim 11, wherein the first forming surface of the push plate is a smooth, planar surface.

13. The tortilla press assembly as defined in claim 12, wherein the second forming surface and the third forming surface each include an embossing pattern to emboss the tortilla shell.

14. The tortilla press assembly as defined in claim 7, further comprising a spacer defining a through hole disposed between the arm and the crank, wherein the cam follower extends through a hole of the spacer to couple to a threaded hole of the arm.

15. The tortilla press assembly as defined in claim 14, wherein the spacer has sufficient depth to position the crank out of the crank recess.

16. A tortilla press assembly for molding dough into a tortilla shell, said forming machine comprising:
   a base having an upper surface that defines an upper recess upper recess having a prescribed depth;
   a base plate having a first forming surface, the base plate received within the upper recess, in use;
   a push plate having a second forming surface disposed above and axially aligned with the first forming surface along an actuating axis, the push plate mounted for movement only along the actuating axis;
   an actuating mechanism for actuating said second forming surface along the actuating axis between a loading position and a forming position to mold dough into a tortilla shell along the actuating axis, the actuating mechanism including,
      a mechanism housing attached to the base adjacent to the upper recess, the housing defining an upper opening,
      an arm having a vertical portion extending out of the upper opening and a horizontal portion extending from the vertical portion over the base plate, the vertical portion defining a crank recess along a sidewall thereof,
      a crank shaft defining shaft axis and extending across the housing transverse to the vertical portion of the arm,
      a crank extending between the crank shaft and the crank recess of the arm, operatively coupled thereto,
      a cam follower attaching the crank to the crank recess of the arm,
      a spacer disposed in the crank recess between the arm and the crank, the spacer defining a through hole through which the cam follower extends through to couple to the crank, and
      a handle attached to the crank shaft to turn the crank shaft about the shaft axis, thereby actuating the second forming surface along the actuating axis between a loading position and a forming position to mold dough into a tortilla shell.

17. The tortilla press assembly as defined in claim 16, wherein the crank defines a first aperture through which the crank shaft is received and a second aperture through which the cam follower is received.

18. The tortilla press assembly as defined in claim 16, wherein the spacer has sufficient depth to position the crank out of the crank recess.

\* \* \* \* \*